United States Patent
Pai et al.

(10) Patent No.: US 12,483,473 B1
(45) Date of Patent: Nov. 25, 2025

(54) UTILIZING CONFIDENCE SCORES TO ASSESS VERSIONS AND ROLLOUTS OF DEVICE UPGRADES

(71) Applicant: Juniper Networks, Inc., Sunnyvale, CA (US)

(72) Inventors: Raghuram Malpe Pai, Santa Clara, CA (US); Harsha Lakshmikanth, Bangalore (IN); Khemendra Kumar, Bangalore (IN); Yixiao Wei, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 31 days.

(21) Appl. No.: 18/432,402

(22) Filed: Feb. 5, 2024

(51) Int. Cl.
*G06F 15/16* (2006.01)
*H04L 41/0816* (2022.01)
*H04L 41/0894* (2022.01)
*H04L 43/065* (2022.01)

(52) U.S. Cl.
CPC ...... *H04L 41/0816* (2013.01); *H04L 41/0894* (2022.05); *H04L 43/065* (2013.01)

(58) Field of Classification Search
None
See application file for complete search history.

(56) References Cited

U.S. PATENT DOCUMENTS

| | | | |
|---|---|---|---|
| 2021/0014127 A1* | 1/2021 | Iyengar | H04L 41/0686 |
| 2021/0286614 A1* | 9/2021 | Nicolae | H04L 41/0895 |

* cited by examiner

*Primary Examiner* — Padma Mundur
(74) *Attorney, Agent, or Firm* — Harrity & Harrity, LLP

(57) ABSTRACT

A device may determine base confidence factor data for a plurality of edge devices, and may identify an upgrade for the plurality of edge devices. The device may cause the upgrade to be incrementally implemented by a set of edge devices of the plurality of edge devices, and may receive variable confidence factor data associated with implementing the upgrade by the set of edge devices. The device may calculate a confidence score based on the base confidence factor data and the variable confidence factor data, and may determine whether the confidence score satisfies a score threshold. The device may selectively cause the upgrade to be removed from the set of edge devices based on the confidence score failing to satisfy the score threshold, or cause the upgrade to be implemented by a remaining set of edge devices, of the plurality of edge devices, based on the confidence score satisfying the score threshold.

20 Claims, 12 Drawing Sheets

US 12,483,473 B1

UTILIZING CONFIDENCE SCORES TO ASSESS VERSIONS AND ROLLOUTS OF DEVICE UPGRADES

BACKGROUND

Cloud computing is the on-demand delivery of computing services, such as storage, software, analytics, and databases over the Internet to offer flexible resources and economies of scale.

SUMMARY

Some implementations described herein relate to a method. The method may include determining base confidence factor data for a plurality of edge devices, and identifying an upgrade for the plurality of edge devices. The method may include causing the upgrade to be incrementally implemented by a set of edge devices of the plurality of edge devices, and receiving variable confidence factor data associated with implementing the upgrade by the set of edge devices. The method may include calculating a confidence score based on the base confidence factor data and the variable confidence factor data, and determining whether the confidence score satisfies a score threshold. The method may include selectively causing the upgrade to be removed from the set of edge devices based on the confidence score failing to satisfy the score threshold or causing the upgrade to be implemented by a remaining set of edge devices, of the plurality of edge devices, based on the confidence score satisfying the score threshold.

Some implementations described herein relate to a device. The device may include one or more memories and one or more processors. The one or more processors may be configured to determine base confidence factor data for a plurality of edge devices, and identify an upgrade for the plurality of edge devices. The one or more processors may be configured to cause the upgrade to be incrementally implemented by a set of edge devices of the plurality of edge devices, and receive variable confidence factor data associated with implementing the upgrade by the set of edge devices. The one or more processors may be configured to calculate a confidence score based on the base confidence factor data and the variable confidence factor data, and determine whether the confidence score satisfies a score threshold. The one or more processors may be configured to selectively cause the upgrade to be removed from the set of edge devices based on the confidence score failing to satisfy the score threshold, or cause the upgrade to be implemented by a remaining set of edge devices, of the plurality of edge devices, based on the confidence score satisfying the score threshold, wherein a first number of the set of edge devices is less than a second number of the remaining set of edge devices.

Some implementations described herein relate to a non-transitory computer-readable medium that stores a set of instructions. The set of instructions, when executed by one or more processors of a device, may cause the device to determine base confidence factor data for a plurality of edge devices, and identify an upgrade for the plurality of edge devices. The set of instructions, when executed by one or more processors of the device, may cause the device to cause the upgrade to be incrementally implemented by a set of edge devices of the plurality of edge devices, and receive variable confidence factor data associated with implementing the upgrade by the set of edge devices. The set of instructions, when executed by one or more processors of the device, may cause the device to calculate a confidence score based on the base confidence factor data and the variable confidence factor data, and determine updated base confidence factor data and updated variable confidence factor data. The set of instructions, when executed by one or more processors of the device, may cause the device to recalculate the confidence score based on the updated base confidence factor data and the updated variable confidence factor data, and determine whether the confidence score satisfies a score threshold. The set of instructions, when executed by one or more processors of the device, may cause the device to selectively cause the upgrade to be removed from the set of edge devices based on the confidence score failing to satisfy the score threshold or cause the upgrade to be implemented by a remaining set of edge devices, of the plurality of edge devices, based on the confidence score satisfying the score threshold.

DETAILED DESCRIPTION

Figure 1A:
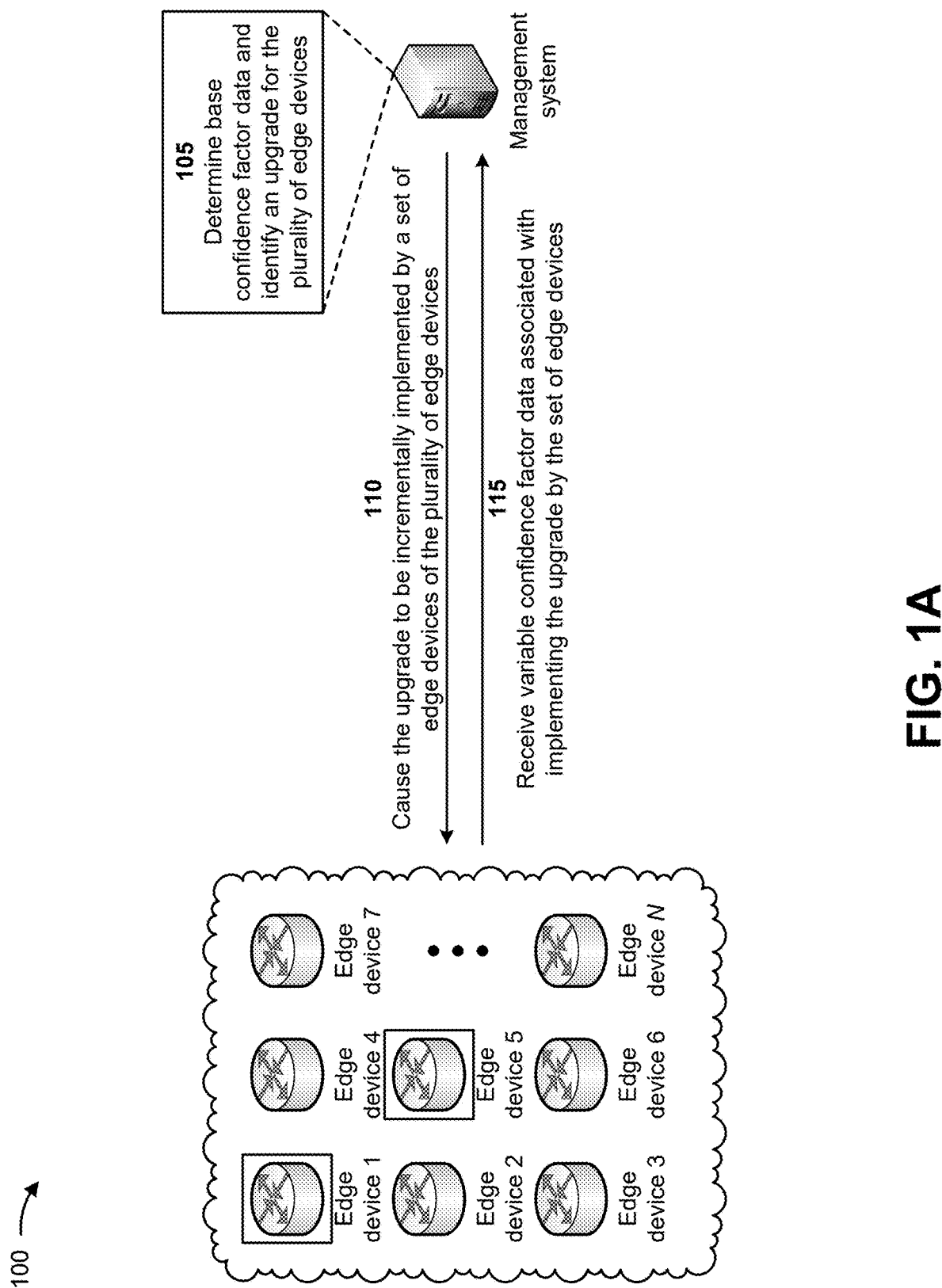
FIGS. 1A-1H are diagrams of an example associated with utilizing confidence scores to assess versions and rollouts of device upgrades.

The following detailed description of example implementations refers to the accompanying drawings. The same reference numbers in different drawings may identify the same or similar elements.

A cloud-based platform may support several applications for customers. However, many customers are unwilling to connect devices directly to the cloud-based platform. Such customers may deploy edge devices on premises to connect to the cloud-based platform and act as a buffer between the customers' devices and the cloud-based platform. The edge devices may include thin clients (e.g., Internet of Things (IoT) devices) and/or non-thin clients (e.g., routers, switches, firewalls, access points, and/or the like). Seamless onboarding, service deployment, lifecycle management, and monitoring is needed for the edge devices. Service deployment and upgrades are crucial parts of life-cycle management of the edge devices and also define a user experience. Upgrades of edge devices may be hosted and managed from the cloud-based platform (e.g., in repositories) at a single location or at a few locations. Handling upgrades of edge devices is a crucial part of life-cycle management of the edge devices or any other devices managed by the cloud-based platform. However, current techniques for handling upgrades of edge devices fail to provide a close-loop solution for upgrades. The current techniques fail to lessen risks associated with large scale distribution of an inoperable upgrade, fail to scale upgrade rollouts based on confidence in an operability of the upgrade, fail to support rollback of an inoperable upgrade, fail to evenly distribute a load on the cloud-based platform when a large quantity of edge devices are to receive the upgrade, and/or the like.

Thus, current techniques for handling upgrades for edge devices associated with a cloud-based platform consume computing resources (e.g., processing resources, memory resources, communication resources, and/or the like), networking resources, and/or the like, associated with providing poor service and upgrade experiences for the cloud-based platform and the edge devices, experiencing performance issues with edge devices that are provided inoperable upgrades, attempting to provide upgrades for the edge devices from non-secure sources creating security issues for customers of the edge devices upgraded from non-secure sources, and/or the like.

Some implementations described herein relate to a device (e.g., a management system) that utilizes confidence scores to assess versions and rollouts of device upgrades. For example, the management system may determine base confidence factor data for a plurality of edge devices, and may identify an upgrade for the plurality of edge devices. The management system may cause the upgrade to be incrementally implemented by a set of edge devices of the plurality of edge devices, and may receive variable confidence factor data associated with implementing the upgrade by the set of edge devices. The management system may calculate a confidence score based on the base confidence factor data and the variable confidence factor data, and may determine whether the confidence score satisfies a score threshold. The management system may selectively cause the upgrade to be removed from the set of edge devices based on the confidence score failing to satisfy the score threshold, or cause the upgrade to be implemented by a remaining set of edge devices, of the plurality of edge devices, based on the confidence score satisfying the score threshold In this way, the management system utilizes confidence scores to assess versions and rollouts of device upgrades. For example, the management system may cause an upgrade to be implemented to a small set of edge devices, and may receive feedback (e.g., multiple factors) associated with the upgrade from the small set of edge devices. The management system may calculate a confidence score for the upgrade based on the feedback, and may determine how to handle further implementation of the upgrade based on the confidence score. For example, a low confidence score (e.g., approaching zero percent) may cause the management system to roll back the upgrade from the small set of edge devices, and a high confidence score (e.g., approaching one hundred percent) may cause the management system to implement the upgrade in all remaining edge devices. Thus, the management system conserves computing resources, networking resources, and/or the like that would otherwise have been consumed by providing poor service and upgrade experiences for the cloud-based platform and the edge devices, experiencing performance issues with edge devices that are provided inoperable upgrades, attempting to provide upgrades for the edge devices from non-secure sources creating security issues for customers of the edge devices upgraded from non-secure sources, and/or the like.

FIGS. 1A-1H are diagrams of an example 100 associated with utilizing confidence scores to assess versions and rollouts of device upgrades. As shown in FIGS. 1A-1H, example 100 includes a plurality of edge devices (e.g., edge device 1 through edge device N) associated with a management system. The management system may include a system that utilizes confidence scores to assess versions and rollouts of device upgrades. Each of the edge devices may include an edge network device, another managed device (e.g., an Internet of Things (IoT) device, a wireless access point, a router, a switch, a firewall, and/or the like), or any device whose lifecycle needs to be managed from a controller, a public cloud computing environment, or a private cloud computing environment. In some implementations, one or more edge devices may directly connect to a cloud computing environment. For example, a wireless access point may directly connect to a cloud computing environment, and the management system may manage an upgrade of the wireless access point in a same manner as the edge devices. Further details of the plurality of edge devices and the management system are provided elsewhere herein.

As shown in FIG. 1A, and by reference number 105, the management system may determine base confidence factor data for the plurality of edge devices and may identify an upgrade for the plurality of edge devices. For example, the management system may determine the base confidence factor data based on prior upgrades associated with the plurality of edge devices. The base confidence factor data may include factors affecting the confidence score before the upgrade is released, which may determine a rate of implementing the upgrade in the set of edge devices. In some implementations, the base confidence factor data includes data identifying a quantity of changes, a cyclomatic complexity, a component history, a regression report, one or more bugs, a static tools report, a code coverage, and/or the like. The management system may determine that a new upgrade for the plurality of edge devices is available based on types of the plurality of edge devices (e.g., a new upgrade available for a particular type of router), based on the base confidence factor data, and/or the like. In another example, the management system may provide periodic upgrades to the plurality of edge devices and may identify the upgrade for the plurality of edge devices based on a schedule of periodic upgrades. In some implementations, the management system may provide intelligent upgrades for the plurality of edge devices to ensure a high probability of success. In some implementations, the management system may identify the upgrade for the plurality of edge devices to minimize timeout and retry possibilities. In some implementations, the management system may identify one or more underperforming key performance indicators (KPIs) associated with the plurality of edge devices, and may identify an upgrade for the plurality of edge devices that will improve the one or more underperforming KPIs.

As further shown in FIG. 1A, and by reference number 110, the management system may cause the upgrade to be incrementally implemented by a set of edge devices of the plurality of edge devices. For example, rather than causing the upgrade to be implemented by the plurality of edge devices at the same time (e.g., which might cause network outages when the upgrade causes the plurality of edge devices to function poorly or be inoperable), the management system may identify a set of edge devices, of the plurality of edge devices, to which to implement the upgrade. In some implementations, a first number of edge devices in the set of edge devices may be significantly less than a second number of edge devices in a remaining set of the plurality of edge devices. For example, the first number may be one percent, five percent, ten percent, and/or the like of the second number. In some implementations, the management system may cause the upgrade to be incrementally implemented by the set of edge devices by causing one or more edge devices of the set of edge devices to implement the upgrade at a first time, causing one or more additional edge devices of the set of edge devices to implement the upgrade at a second time after the first time, and/or the like. In this way, the management system may minimize the risk associated with large scale distribution of the upgrade.

In some implementations, when causing the upgrade to be incrementally implemented by the set of edge devices of the plurality of edge devices, the management system may instruct the set of edge devices to install the upgrade (e.g., an automatic implementation) or may provide, to a user, a notification indicating that the upgrade is to be installed on the set of edge devices (e.g., a manual implementation). The user may install the upgrade on the set of edge devices based on the notification.

As further shown in FIG. 1A, and by reference number 115, the management system may receive variable confidence factor data associated with implementing the upgrade by the set of edge devices. For example, the set of edge devices may implement the upgrade and may generate data utilized to calculate a confidence score associated with the upgrade. In some implementations, the generated data may include the base confidence factor data and/or the variable confidence factor data. The variable confidence factor data may include factors affecting the confidence score after the upgrade is released to the set of edge devices, which may determine a rate of implementing the upgrade in a remaining set of edge devices or whether to implement the upgrade in the remaining set of edge devices. In some implementations, the variable confidence factor data includes data identifying a system health associated with the upgrade, a service health associated with the upgrade, a service error associated with the upgrade, a pre-post-snapshot associated with the upgrade, an age of the upgrade, a number of the set of edge devices, a critical mass associated with the upgrade, a sentiment analysis associated with the upgrade, and/or the like. In some implementations, the base confidence factor data and the variable confidence factor data may be associated with tunable weights.

Figure 1B:
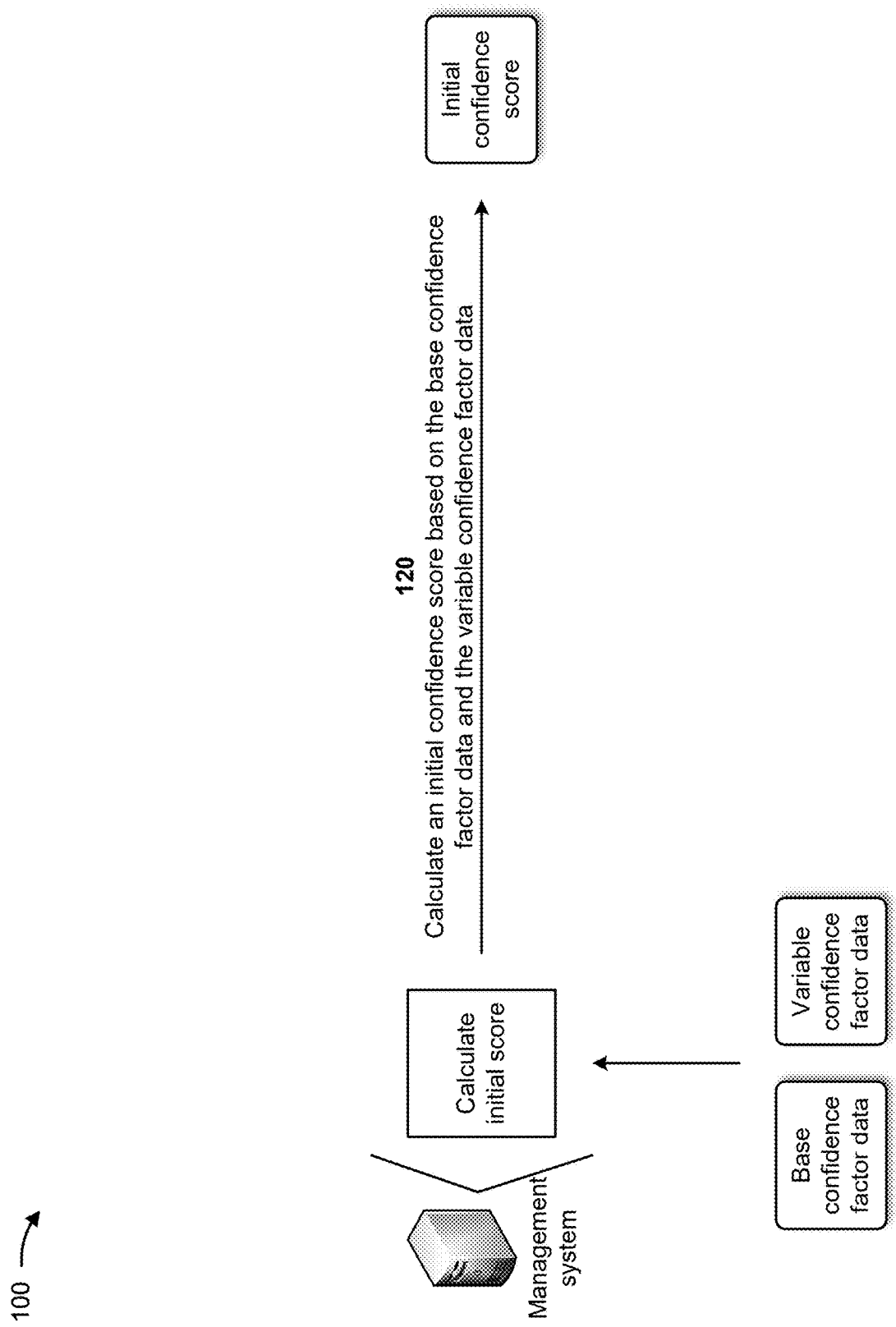

As shown in FIG. 1B, and by reference number 120, the management system may calculate an initial confidence score based on the base confidence factor data and the variable confidence factor data. For example, the management system may determine positive factors associated with the base confidence factor data and the variable confidence factor data, and may determine negative factors associated with the base confidence factor data and the variable confidence factor data. In one example, each of the positive factors and each of the negative factors may be associated with a value (e.g., one). The management system may subtract the negative factors from the positive factors to generate a first number. The management system may add a quantity of the positive factors and a quantity of the negative factors to generate a second number. The management system may divide the first number by the second number to calculate the initial confidence score. For example, if there are fifteen positive factors (e.g., each with a value of one) and five negative factors (e.g., each with a value of one), the first number may be ten and the second number may be twenty. In such an example, the management system may calculate an initial confidence score of 0.50 or fifty percent (e.g., ten divided by twenty).

In some implementations, each of the positive factors may be associated with a different value, each of the positive factors may be associated with a different weight, each of the negative factors may be associated with a different value, each of the negative factors may be associated with a different weight, and/or the like. In some implementations, the management system may periodically calculate the initial confidence score as the base confidence factor data and the variable confidence factor data is received by the management system. Alternatively, the management system may calculate the initial confidence score based on a trigger (e.g., when a particular amount of the base confidence factor data and/or the variable confidence factor data is received by the management system). In some implementations, the management system may determine updated base confidence factor data and updated variable confidence factor data. The management system may recalculate the initial confidence score based on the updated base confidence factor data and the updated variable confidence factor data. The initial confidence score may provide an indication of a reliability of the upgrade.

Figure 1C:
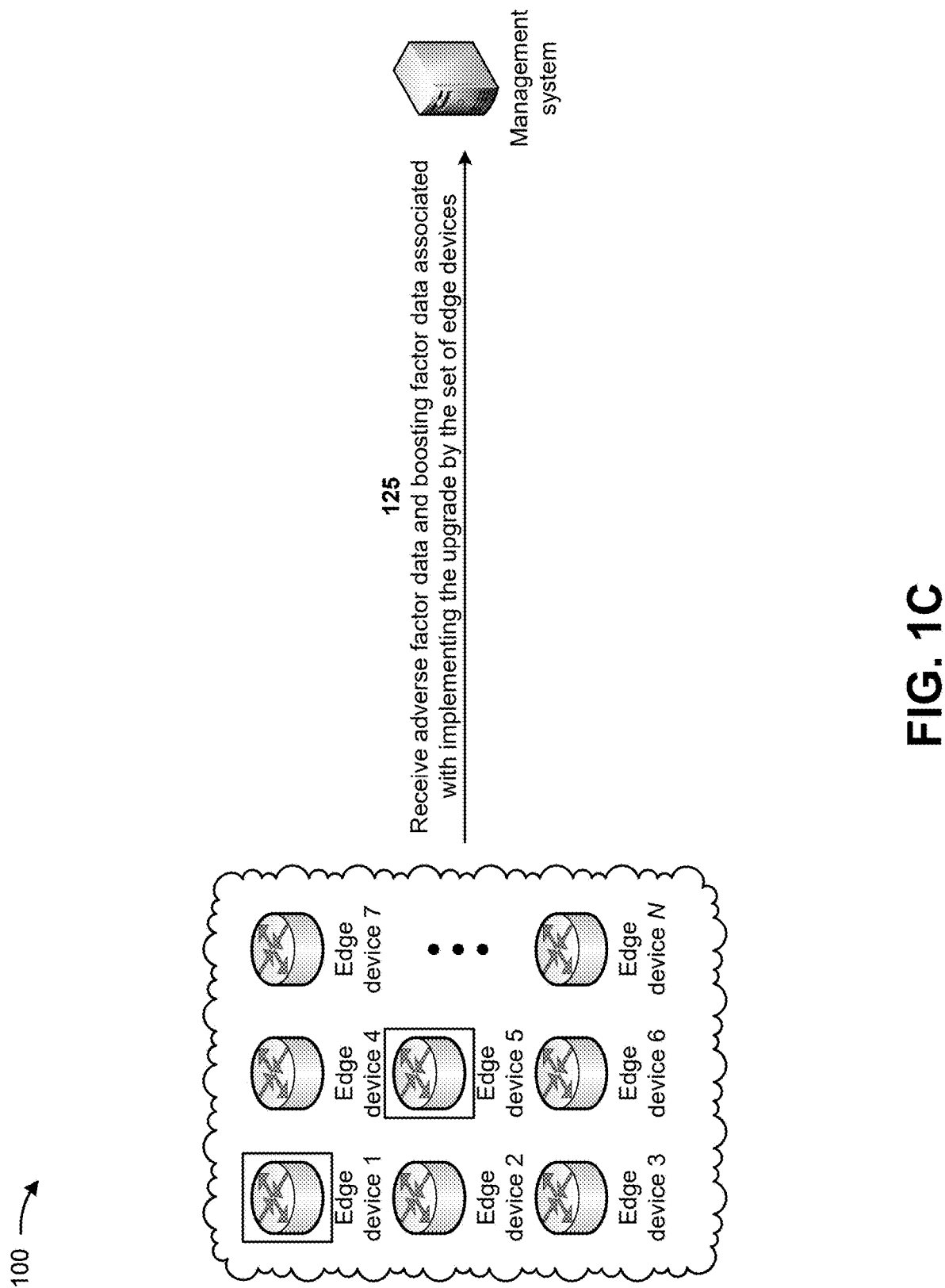

As shown in FIG. 1C, and by reference number 125, the management system may receive adverse factor data and boosting factor data associated with implementing the upgrade by the set of edge devices. For example, the set of edge devices may implement the upgrade and may generate data utilized to decrease or increase the initial confidence score associated with the upgrade. In some implementations, the data utilized to decrease the initial confidence score may include the adverse factor data associated with implementing the upgrade by the set of edge devices, and the data utilized to increase the initial confidence score may include the boosting factor data associated with implementing the upgrade by the set of edge devices. In some implementations, the adverse factor data may include data identifying a crash associated with the upgrade, a restart associated with the upgrade, a critical service error associated with the upgrade, a reboot associated with the upgrade, a switch to a control version deployment associated with the upgrade, and/or the like. In some implementations, the boosting factor data may include data identifying a critical bug fix associated with the upgrade, a security incident response team issue fix associated with the upgrade, and/or the like.

Figure 1D:
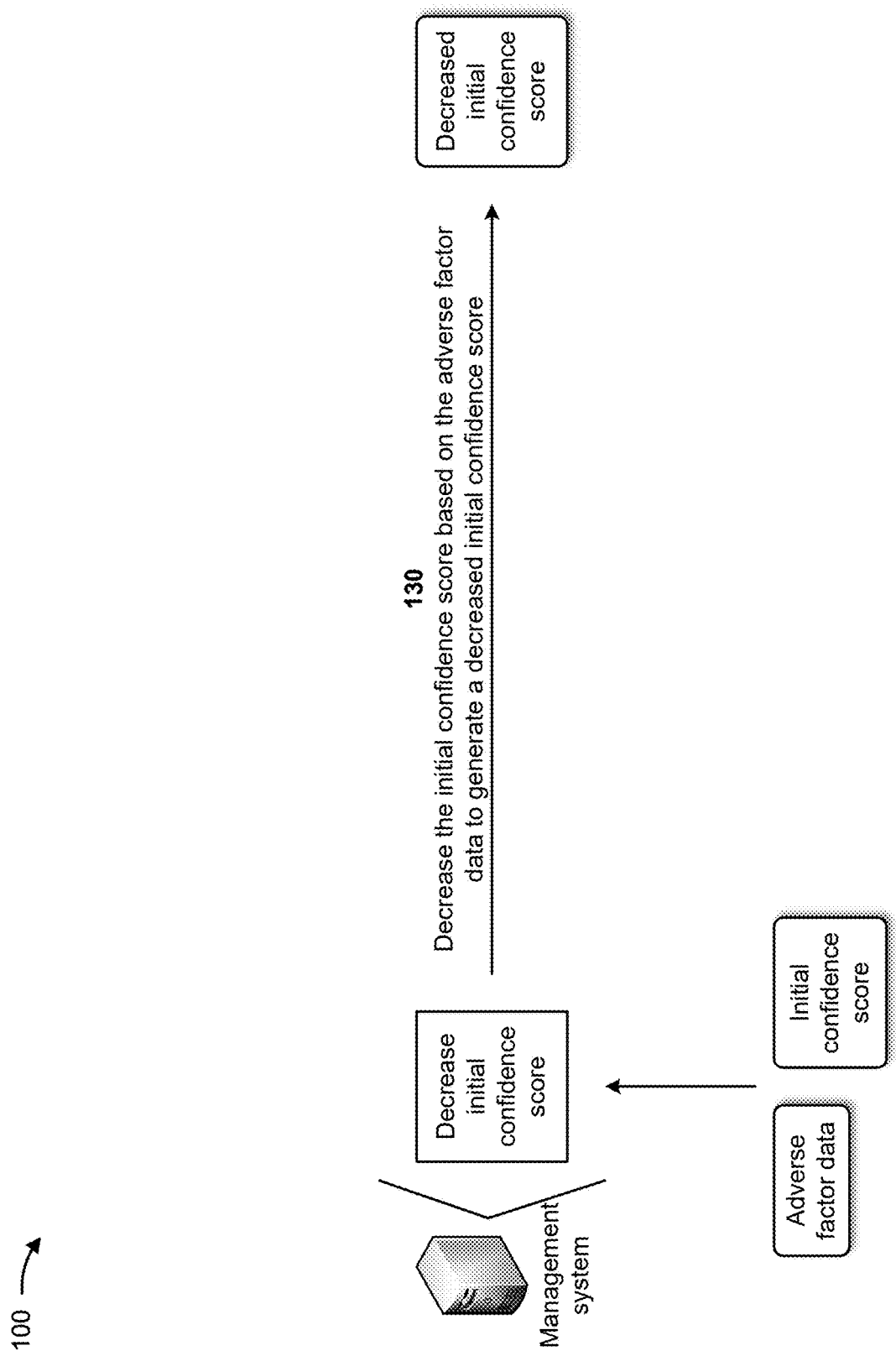

As shown in FIG. 1D, and by reference number 130, the management system may decrease the initial confidence score based on the adverse factor data to generate a decreased initial confidence score. For example, the management system may include the adverse factor data (e.g., adverse factors) in the negative factors associated with the base confidence factor data and the variable confidence factor data. If each of the positive factors, each of the negative factors, and each of the adverse factors are associated with a value (e.g., one), the management system may subtract the negative factors and the adverse factors from the positive factors to generate a first number. The management system may add a quantity of the positive factors, a quantity of the negative factors, and a quantity of the adverse factors to generate a second number. The management system may divide the first number by the second number to calculate the decreased initial confidence score. In some implementations, the management system may utilize the adverse factor data to increase weights associated with the negative factors, which will decrease the initial confidence score and generate the decreased initial confidence score.

Figure 1E:
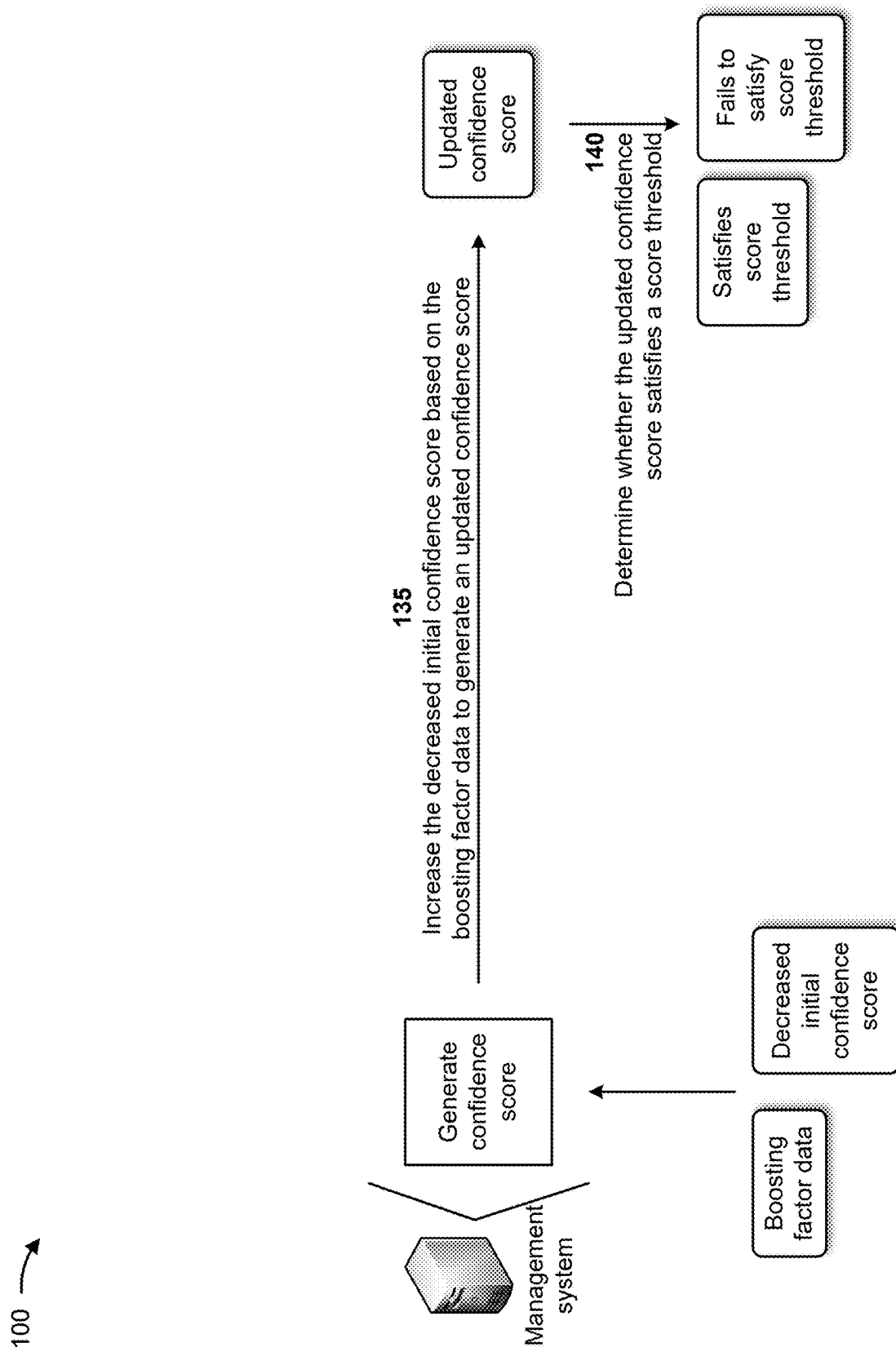

As shown in FIG. 1E, and by reference number 135, the management system may increase the decreased initial confidence score based on the boosting factor data to generate an updated confidence score. For example, the management system may include the boosting factor data (e.g., boosting factors) in the positive factors associated with the base confidence factor data and the variable confidence factor data. If each of the positive factors, each of the negative factors, and each of the boosting factors are associated with a value (e.g., one), the management system may add the boosting factors and the positive factors to generate a first number and may subtract the negative factors from the first number to generate a second number. The management system may add a quantity of the positive factors, a quantity of the negative factors, and a quantity of the boosting factors to generate a third number. The management system may divide the second number by the third number to calculate the updated confidence score. In some implementations, the management system may utilize the boosting factor data to increase weights associated with the positive factors, which will increase the decreased initial confidence score and generate the updated confidence score. In some implementations, the management system may periodically modify the values and/or the weights assigned to the factors, may continuously modify the values and/or the weights assigned to the factors, and/or the like.

As further shown in FIG. 1E, and by reference number 140, the management system may determine whether the updated confidence score satisfies a score threshold. For example, the management system may determine a score threshold to be achieved in order to continue with implementing the upgrade in the plurality of edge devices. In some implementations, the score threshold may be thirty percent, forty percent, fifty percent, and/or the like. In some implementations, the management system may increase the score threshold over time as more of the plurality of edge devices successfully implement the upgrade. In some implementations, the management system may determine that the updated confidence score fails to satisfy the score threshold. Alternatively, the management system may determine that the updated confidence score satisfies the score threshold.

Figure 1F:
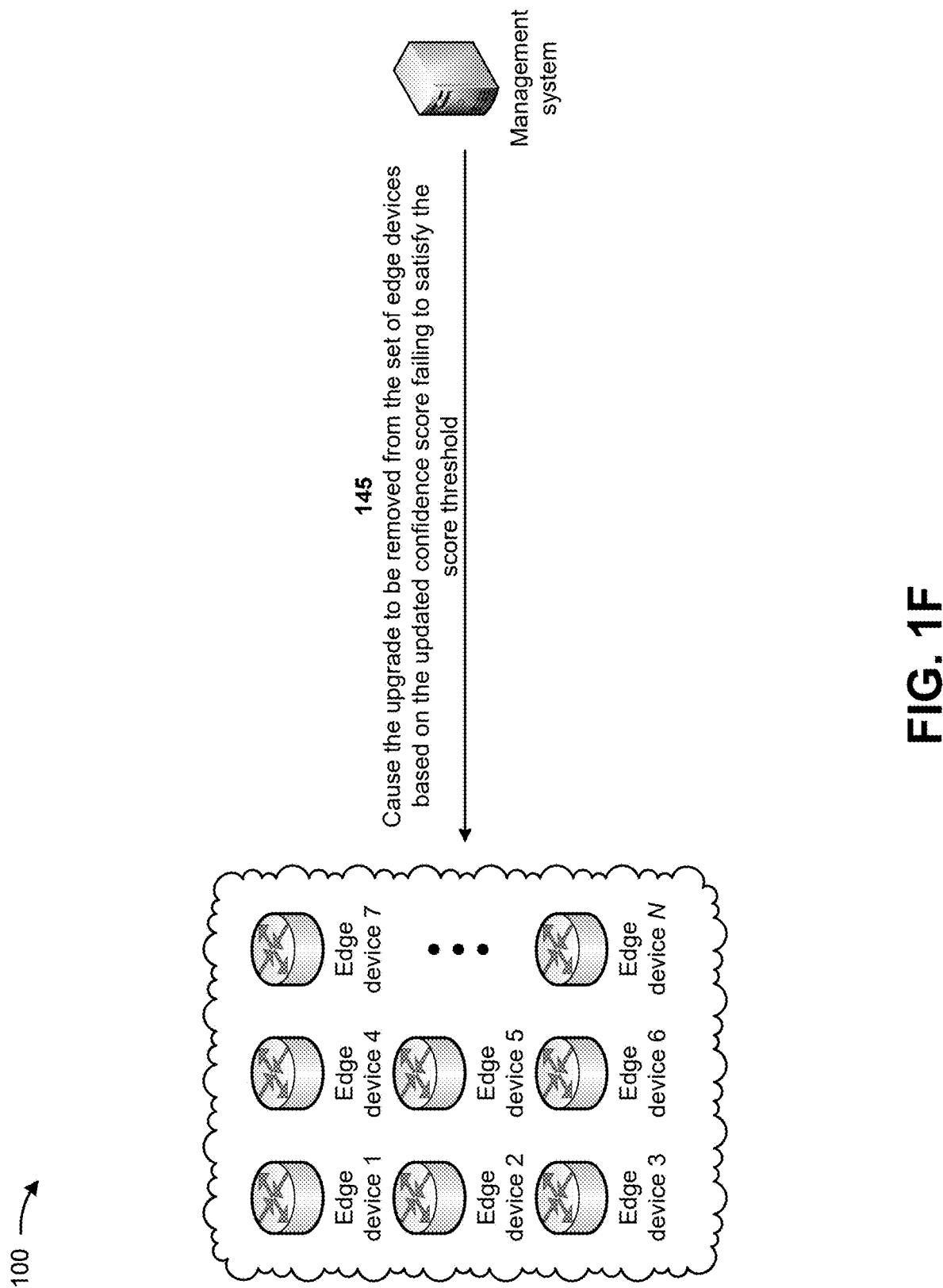

As shown in FIG. 1F, and by reference number 145, the management system may cause the upgrade to be removed from the set of edge devices based on the updated confidence score failing to satisfy the score threshold. For example, when the management system determines that the updated confidence score fails to satisfy the score threshold, the management system may determine that the upgrade is a failure. Accordingly, the management system may cause the set of edge devices to remove the upgrade and roll back to a previous software version. The management system may also prevent the upgrade from being implemented in a remaining set of edge devices of the plurality of edge devices. In some implementations, when causing the upgrade to be removed from the set of edge devices, the management system may instruct the set of edge devices to remove the upgrade (e.g., an automatic implementation) or may provide, to a user, a notification indicating that the upgrade is to be removed from the set of edge devices (e.g., a manual implementation). The user may remove the upgrade from the set of edge devices based on the notification.

Figure 1G:
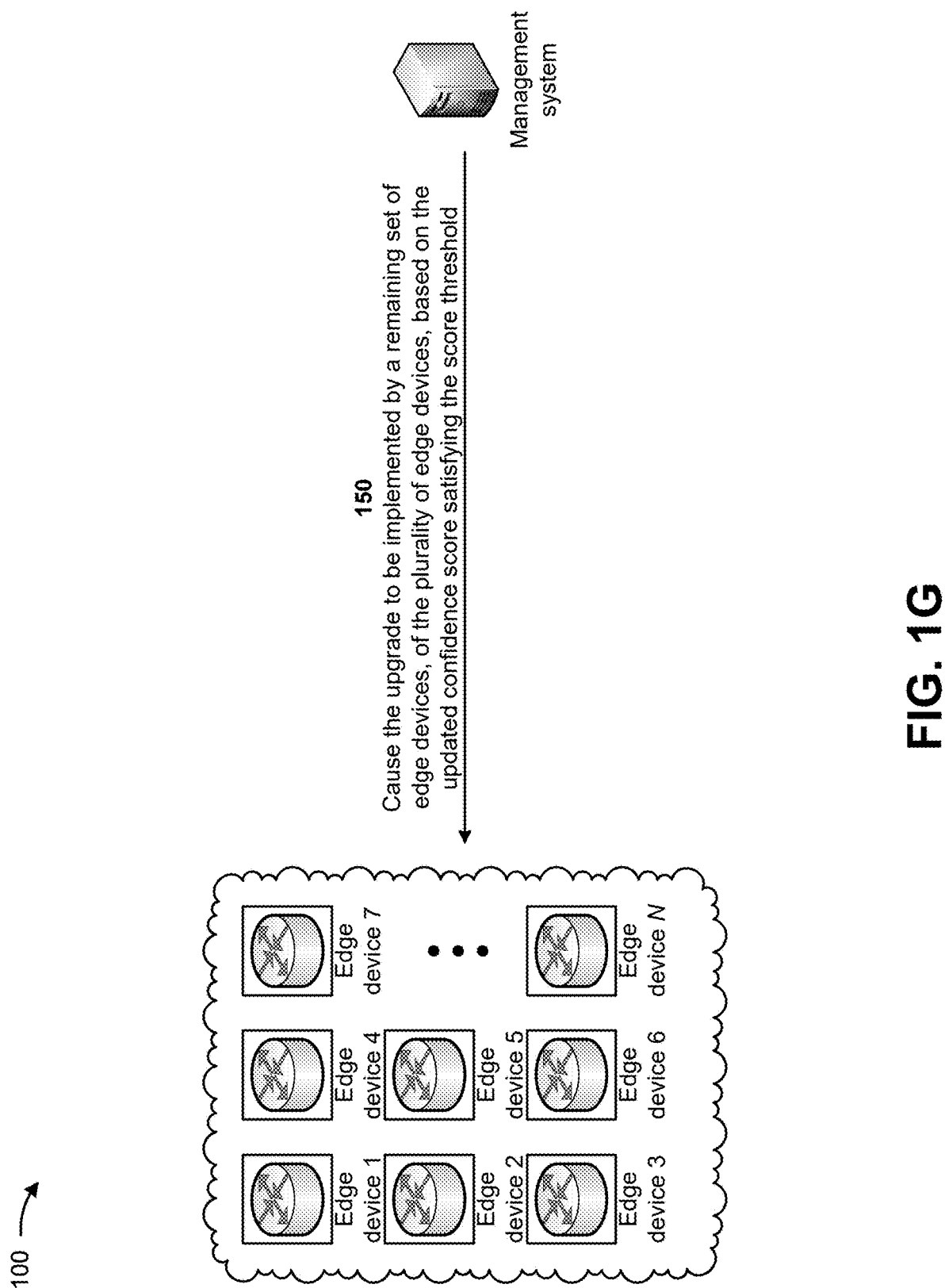

As shown in FIG. 1G, and by reference number 150, the management system may cause the upgrade to be implemented by a remaining set of edge devices, of the plurality of edge devices, based on the updated confidence score satisfying the score threshold. For example, when the management system determines that the updated confidence score satisfies the score threshold, the management system may determine that the upgrade is a success. Accordingly, the management system may cause the remaining set of edge devices to implement the upgrade. In some implementations, when causing the upgrade to be implemented by the remaining set of edge devices, the management system may instruct the remaining set of edge devices to install the upgrade (e.g., an automatic implementation) or may provide, to a user, a notification indicating that the upgrade is to be installed on the remaining set of edge devices (e.g., a manual implementation). The user may install the upgrade on the remaining set of edge devices based on the notification.

Figure 1H:
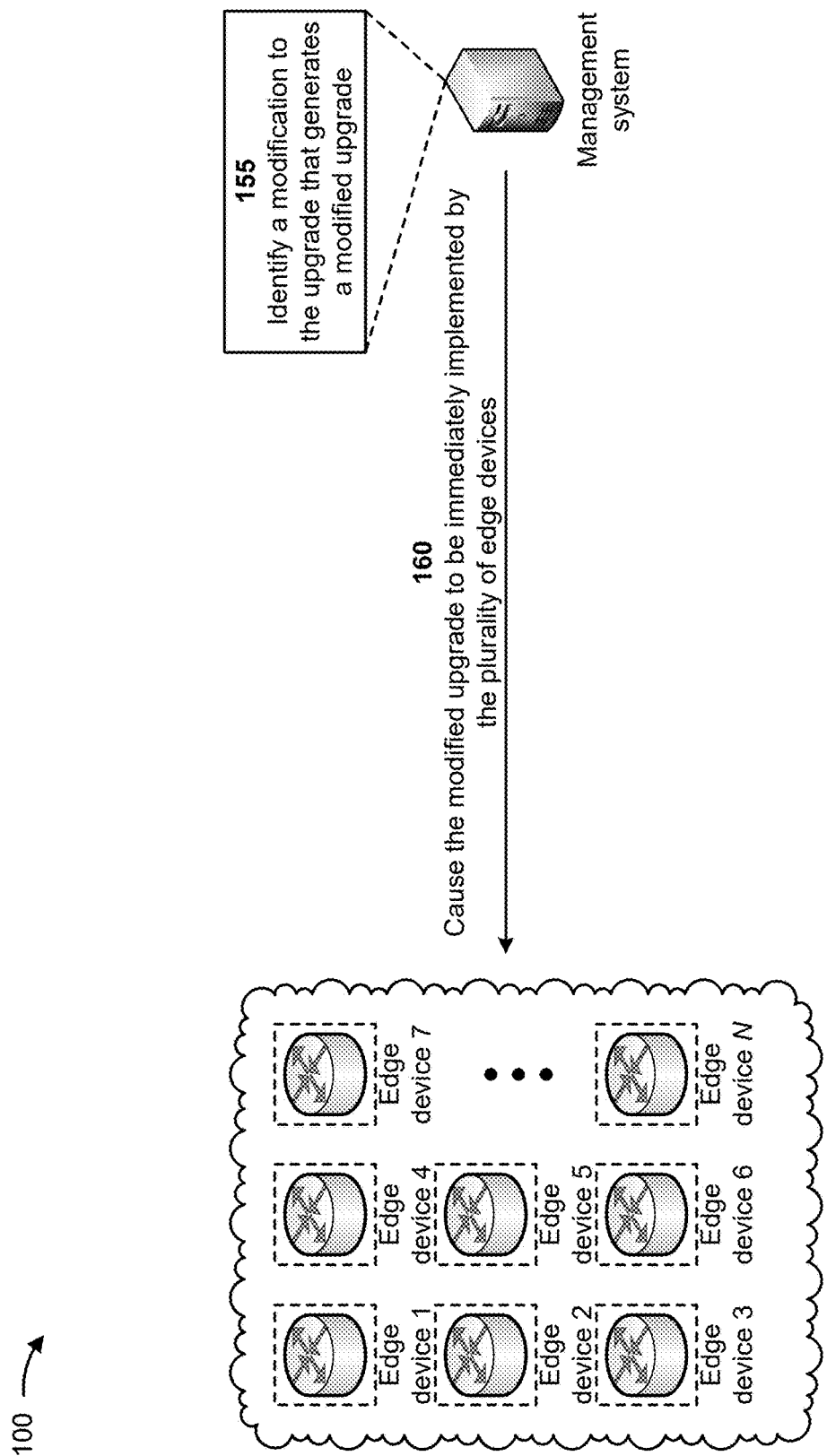

As shown in FIG. 1H, and by reference number 155, the management system may identify a modification to the upgrade that generates a modified upgrade. For example, after the upgrade is successfully implemented by the plurality of edge devices, the management system may identify an issue in the upgrade (e.g., a vulnerability in the upgrade that is exploited, such as a security vulnerability). The management system may identify the modification to the upgrade that addresses the issue in the upgrade and that generates the modified upgrade. In some implementations, the management system may set an updated confidence score of the modified upgrade to satisfy the score threshold since the modification to the successful upgrade does not significantly modify the functioning of the upgrade.

As further shown in FIG. 1H, and by reference number 160, the management system may cause the modified upgrade to be immediately implemented by the plurality of edge devices. For example, when the management system sets the updated confidence score of the modified upgrade to satisfy the score threshold, the management system may cause the modified upgrade to be immediately implemented by the plurality of the edge devices (e.g., rather than incrementally, since the modified upgrade should be successful). In some implementations, when causing the modified upgrade to be immediately implemented by the plurality of edge devices, the management system may instruct the plurality of edge devices to install the modified upgrade (e.g., an automatic implementation) or may provide, to a user, a notification indicating that the modified upgrade is to be installed on the plurality of edge devices (e.g., a manual implementation). The user may install the modified upgrade on the plurality of edge devices based on the notification.

In this way, the management system utilizes confidence scores to assess versions and rollouts of device upgrades. For example, the management system may cause an upgrade to be implemented to a small set of edge devices, and may receive feedback associated with the upgrade from the small set of edge devices. The management system may calculate a confidence score for the upgrade based on the feedback, and may determine how to handle further implementation of the upgrade based on the confidence score. For example, a low confidence score may cause the management system to roll back the upgrade from the small set of edge devices, and a high confidence score may cause the management system to implement the upgrade in all remaining edge devices. Thus, the management system conserves computing resources, networking resources, and/or the like that would otherwise have been consumed by providing poor service and upgrade experiences for the cloud-based platform and the edge devices, experiencing performance issues with edge devices that are provided inoperable upgrades, attempting to provide upgrades for the edge devices from non-secure sources creating security issues for customers of the edge devices upgraded from non-secure sources, and/or the like.

Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
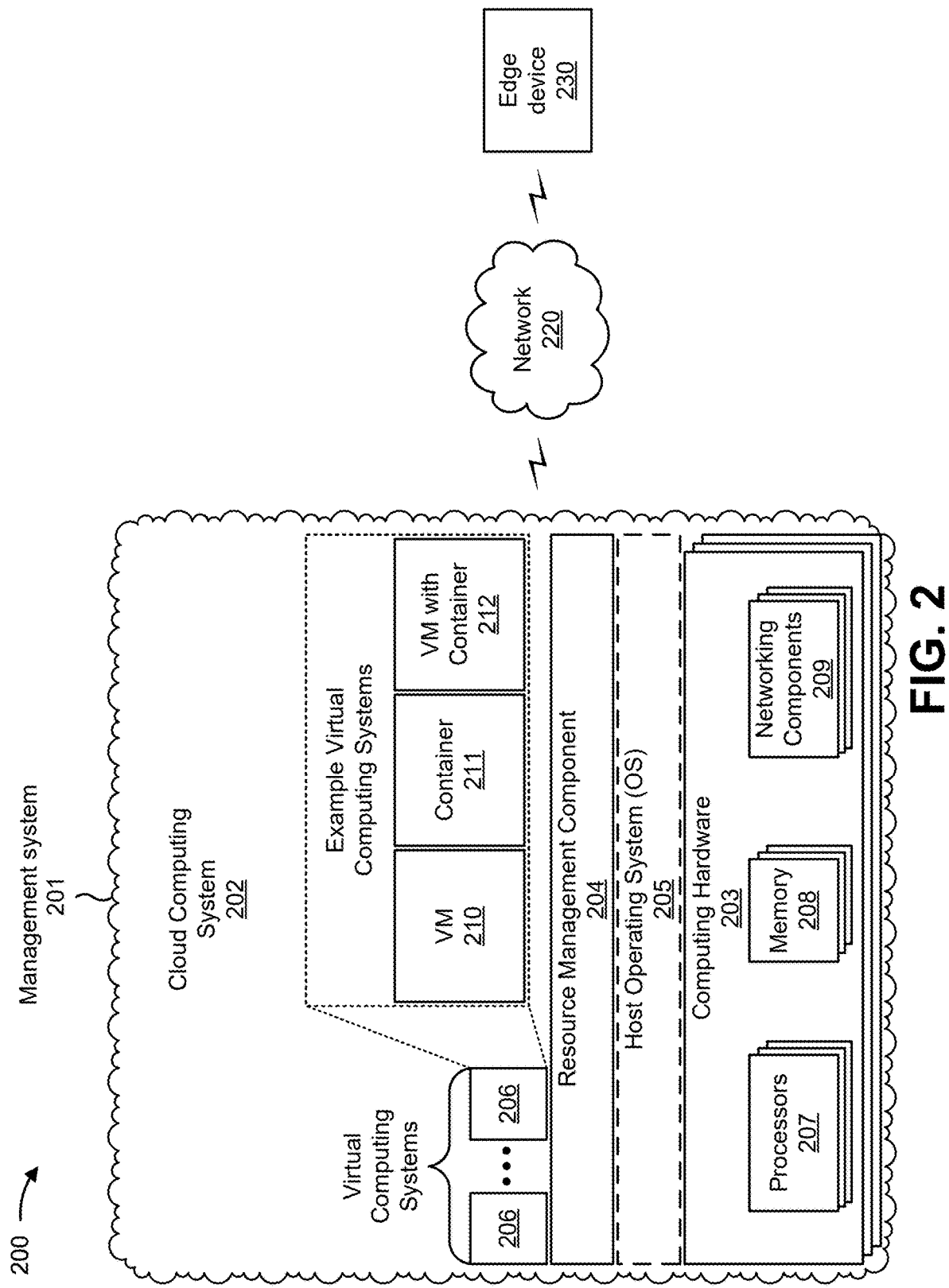
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a management system 201, which may include one or more elements of and/or may execute within a cloud computing system 202. The cloud computing system 202 may include one or more elements 203-212, as described in more detail below. As further shown in FIG. 2, the environment 200 may include a network 220 and/or an edge device 230. Devices and/or elements of the environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as the computing hardware 203) capable of virtualizing the computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using the computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the management system 201 may include one or more elements 203-212 of the cloud computing system 202, may execute within the cloud computing system 202, and/or may be hosted within the cloud computing system 202, in some implementations, the management system 201 may not be cloud-based (e.g., may be implemented outside of a cloud computing system) or may be partially cloud-based. For example, the management system 201 may include one or more devices that are not part of the cloud computing system 202, such as a device 300 of FIG. 3 or a device 400 of FIG. 4, which may include a standalone server or another type of computing device. The management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The edge device 230 may include one or more devices capable of receiving, generating, storing, processing, and/or providing information, as described elsewhere herein. The edge device 230 may include a communication device and/or a computing device. For example, the edge device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), an Internet of Things (IoT) device, or a similar type of device.

The edge device 230 may include one or more devices capable of receiving, processing, storing, routing, and/or providing traffic (e.g., a packet and/or other information or metadata) in a manner described herein. For example, the edge device 230 may include a router, such as a label switching router (LSR), a label edge router (LER), an ingress router, an egress router, a provider router (e.g., a provider edge router or a provider core router), a virtual router, or another type of router. Additionally, or alternatively, the edge device 230 may include a gateway, a switch, a firewall, a hub, a bridge, a reverse proxy, a server (e.g., a proxy server, a cloud server, or a data center server), a load balancer, and/or a similar device. In some implementations, the edge device 230 may be a physical device implemented within a housing, such as a chassis. In some implementations, the edge device 230 may be a virtual device implemented by one or more computing devices of a cloud computing environment or a data center. In some implementations, a group of edge devices 230 may be a group of data center nodes that are used to route traffic flow through a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
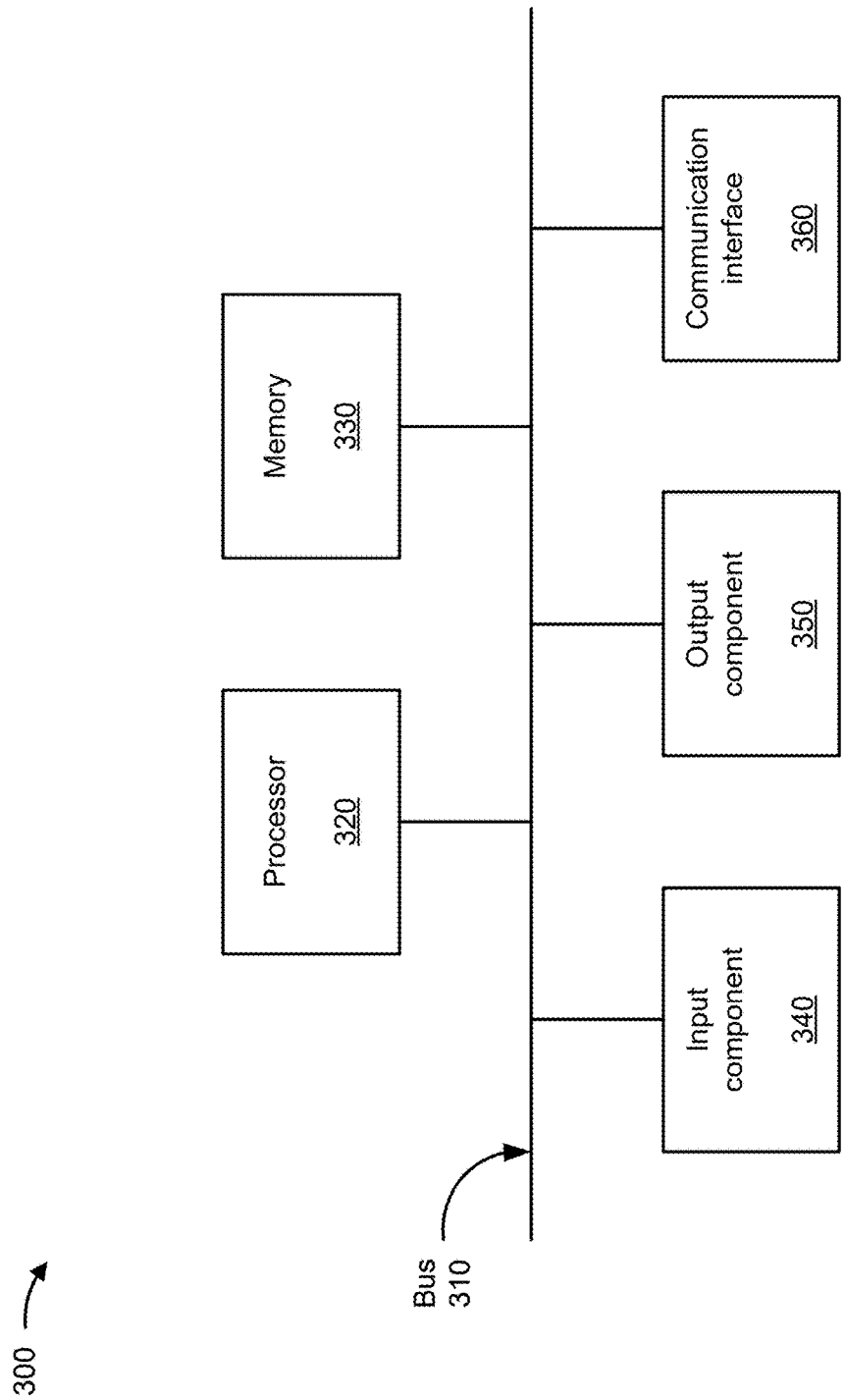
FIGS. 3 and 4 are diagrams of example components of one or more devices of FIG. 2.

FIG. 3 is a diagram of example components of one or more devices of FIG. 2. The example components may be included in a device 300, which may correspond to the management system 201 and/or the edge device 230. In some implementations, the management system 201, the edge device 230, and/or the edge device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
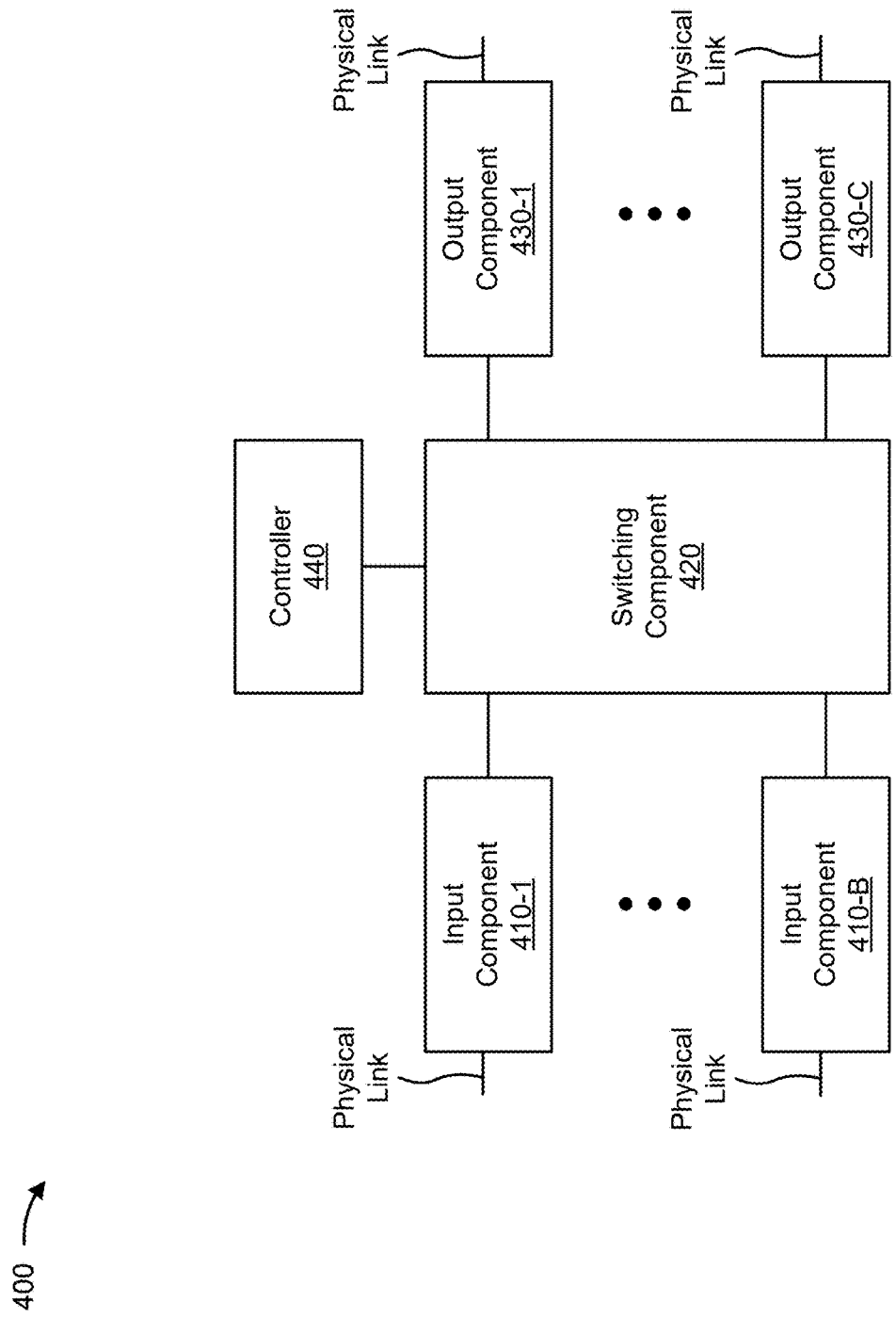

FIG. 4 is a diagram of example components of one or more devices of FIG. 2. The example components may be included in a device 400. The device 400 may correspond to the edge device 230. In some implementations, the edge device 230 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440. In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
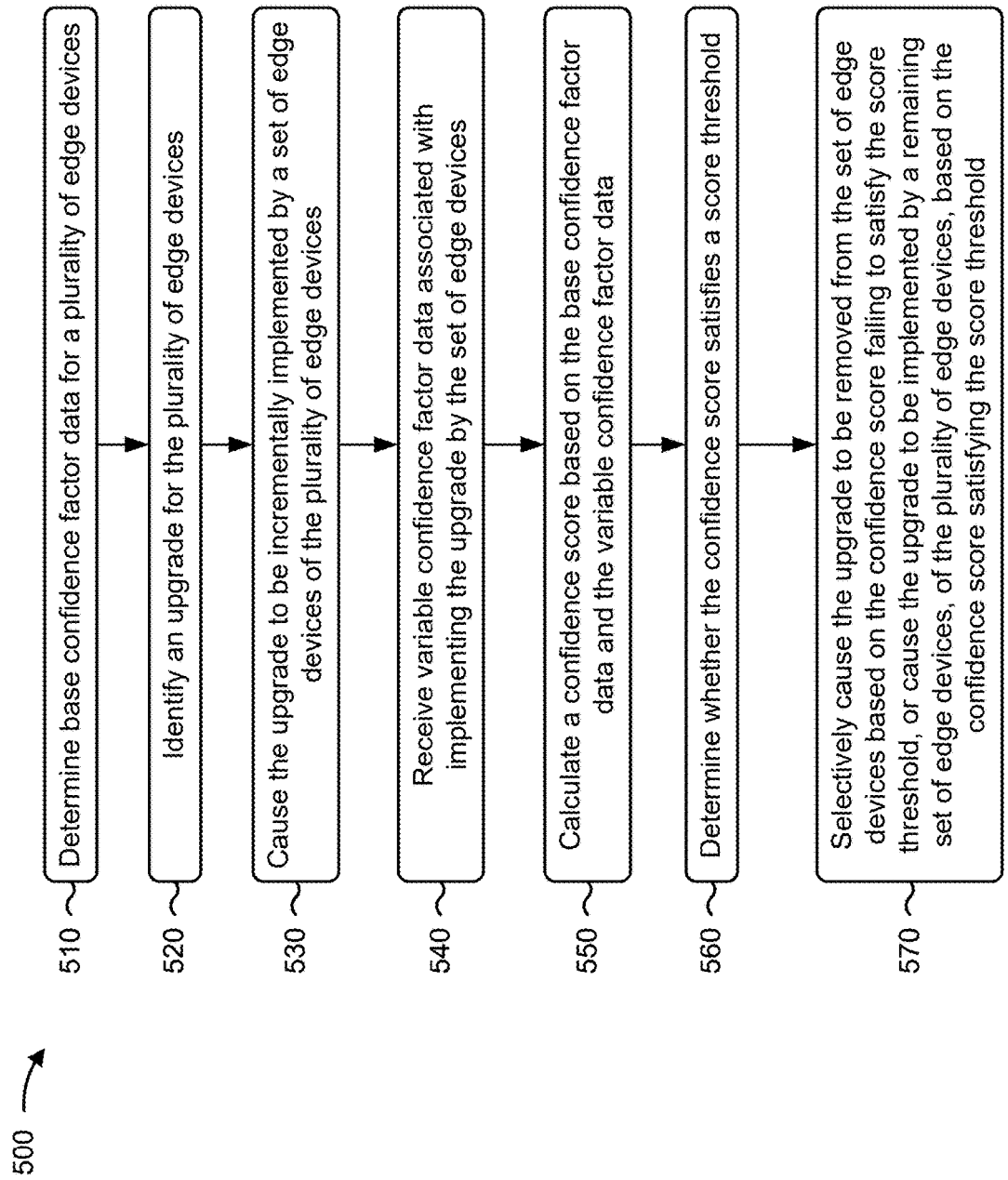
FIG. 5 is a flowchart of an example process for utilizing confidence scores to assess versions and rollouts of device upgrades.

FIG. 5 is a flowchart of an example process 500 for utilizing confidence scores to assess versions and rollouts of device upgrades. In some implementations, one or more process blocks of FIG. 5 may be performed by a device (e.g., the management system 201). In some implementations, one or more process blocks of FIG. 5 may be performed by another device or a group of devices separate from or including the device, such as an edge device (e.g., the edge device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include determining base confidence factor data for a plurality of edge devices (block 510). For example, the device may determine base confidence factor data for a plurality of edge devices, as described above.

As shown in FIG. 5, process 500 may include identifying an upgrade for a plurality of edge devices (block 520). For example, the device may identify an upgrade for a plurality of edge devices, as described above.

As further shown in FIG. 5, process 500 may include causing the upgrade to be incrementally implemented by a set of edge devices of the plurality of edge devices (block 530). For example, the device may cause the upgrade to be incrementally implemented by a set of edge devices of the plurality of edge devices, as described above.

As further shown in FIG. 5, process 500 may include receiving variable confidence factor data associated with implementing the upgrade by the set of edge devices (block 540). For example, the device may receive variable confidence factor data associated with implementing the upgrade by the set of edge devices, as described above. In some implementations, the base confidence factor data includes data identifying one or more of a quantity of changes, a cyclomatic complexity, a component history, a regression report, one or more bugs, a static tools report, or a code coverage. In some implementations, the variable confidence factor data includes data identifying one or more of a system health associated with the upgrade, a service health associated with the upgrade, a service error associated with the upgrade, a pre-post-snapshot associated with the upgrade, an age of the upgrade, a number of the set of edge devices, a critical mass associated with the upgrade, associated with the upgrade, or a sentiment analysis associated with the upgrade. In some implementations, the base confidence factor data and the variable confidence factor data are associated with tunable weights.

As further shown in FIG. 5, process 500 may include calculating a confidence score based on the base confidence factor data and the variable confidence factor data (block 550). For example, the device may calculate a confidence score based on the base confidence factor data and the variable confidence factor data, as described above.

As further shown in FIG. 5, process 500 may include determining whether the confidence score satisfies a score threshold (block 560). For example, the device may determine whether the confidence score satisfies a score threshold, as described above.

As further shown in FIG. 5, process 500 may include selectively causing the upgrade to be removed from the set of edge devices based on the confidence score failing to satisfy the score threshold or causing the upgrade to be implemented by a remaining set of edge devices, of the plurality of edge devices, based on the confidence score satisfying the score threshold (block 570). For example, the device may selectively cause the upgrade to be removed from the set of edge devices based on the confidence score failing to satisfy the score threshold or cause the upgrade to be implemented by a remaining set of edge devices, of the plurality of edge devices, based on the confidence score satisfying the score threshold, as described above. In some implementations, a first number of the set of edge devices is less than a second number of the remaining set of edge devices. In some implementations, causing the upgrade to be removed from the set of edge devices includes instructing the set of edge devices to remove the upgrade, or providing, to a user, a notification indicating that the upgrade is to be removed from the set of edge devices. In some implementations, causing the upgrade to be implemented by the remaining set of edge devices includes instructing the remaining set of edge devices to implement the upgrade, or providing, to a user, a notification indicating that the upgrade is to be implemented by the remaining set of edge devices.

In some implementations, process 500 includes receiving adverse factor data associated with implementing the upgrade by the set of edge devices, and decreasing the confidence score based on the adverse factor data. In some implementations, the adverse factor data includes data identifying one or more of a crash associated with the upgrade, a restart associated with the upgrade, a critical service error associated with the upgrade, a reboot associated with the upgrade, or a switch to a control version deployment associated with the upgrade.

In some implementations, process 500 includes receiving boosting factor data associated with implementing the upgrade by the set of edge devices, and increasing the confidence score based on the boosting factor data. In some implementations, the boosting factor data includes data identifying one or more of a critical bug fix associated with the upgrade, or a security incident response team issue fix associated with the upgrade.

In some implementations, process 500 includes identifying a modification to the upgrade that generates a modified upgrade, and causing the modified upgrade to be immediately implemented by the plurality of edge devices. In some implementations, process 500 includes determining updated base confidence factor data and updated variable confidence factor data, and recalculating the confidence score based on the updated base confidence factor data and the updated variable confidence factor data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
 identifying, by a device, an upgrade for a plurality of edge devices;
 causing, by the device, the upgrade to be intermittently implemented by a set of edge devices of the plurality of edge devices;
 receiving, by the device, base confidence factor data and variable confidence factor data associated with implementing the upgrade by the set of edge devices;
 calculating, by the device, a confidence score based on the base confidence factor data and the variable confidence factor data;
 determining, by the device, whether the confidence score satisfies a threshold score;
 based on a determination that the confidence score fails to satisfy the threshold score,
 causing, by the device, the upgrade to be removed from the set of edge devices;
 based on a determination that the confidence score satisfies the threshold score,
 causing, by the device, the upgrade to be implemented by a remaining set of edge devices, of the plurality of edge devices
 receiving boosting factor data associated with implementing the upgrade by the set of edge devices; and increasing the confidence score based on the boosting factor data.

2. The method of claim 1, further comprising:
receiving adverse factor data associated with implementing the upgrade by the set of edge devices; and
decreasing the confidence score based on the adverse factor data.

3. The method of claim 2, wherein the adverse factor data includes data identifying one or more of:
a crash associated with the upgrade,
a restart associated with the upgrade,
a critical service error associated with the upgrade,
a reboot associated with the upgrade, or
a switch to a control version deployment associated with the upgrade.

4. The method of claim 1, wherein the boosting factor data includes data identifying one or more of:
a critical bug fix associated with the upgrade, or
a security incident response team issue fix associated with the upgrade.

5. The method of claim 1, further comprising:
identifying a modification to the upgrade that generates a modified upgrade; and
causing the modified upgrade to be immediately implemented by the plurality of edge devices.

6. The method of claim 1, wherein a size of the set of edge devices is less than a size of the remaining set of edge devices.

7. A device, comprising:
one or more memories; and
one or more processors to:
identify an upgrade for a plurality of edge devices;
cause the upgrade to be intermittently implemented by a set of edge devices of the plurality of edge devices;
receive base confidence factor data and variable confidence factor data associated with implementing the upgrade by the set of edge devices;
calculate a confidence score based on the base confidence factor data and the variable confidence factor data;
determine whether the confidence score satisfies a threshold score:
based on a determination that the confidence score fails to satisfy the threshold score, cause the upgrade to be removed from the set of edge devices;
based on a determination that the confidence score satisfies the threshold score, cause the upgrade to be implemented by a remaining set of edge devices, of the plurality of edge devices, wherein a size of the set of edge devices is less than a size of the remaining set of edge devices;
receive boosting factor data associated with implementing the upgrade by the set of edge devices; and
increase the confidence score based on the boosting factor data.

8. The device of claim 7, wherein the base confidence factor data includes data identifying one or more of:
a quantity of changes associated with the upgrade,
a cyclomatic complexity associated with the upgrade,
a component history associated with the upgrade,
regression report associated with the upgrade,
one or more bugs associated with the upgrade,
a static tools report associated with the upgrade, or
a code coverage associated with the upgrade.

9. The device of claim 7, wherein the variable confidence factor data includes data identifying one or more of:
a system health associated with the upgrade,
a service health associated with the upgrade,
a service error associated with the upgrade,
a pre-post-snapshot associated with the upgrade,
an age of the upgrade,
a size of the set of edge devices,
a critical mass associated with the upgrade,
feedback associated with the upgrade, or
a sentiment analysis associated with the upgrade.

10. The device of claim 7, wherein the base confidence factor data and the variable confidence factor data are associated with tunable weights.

11. The device of claim 7, wherein the one or more processors, to cause the upgrade to be removed from the set of edge devices, are to:
instruct the set of edge devices to remove the upgrade; or
provide, to a user, a notification indicating that the upgrade is to be removed from the set of edge devices.

12. The device of claim 7, wherein the one or more processors, to cause the upgrade to be implemented by the remaining set of edge devices, are to:
instruct the remaining set of edge devices to implement the upgrade; or
provide, to a user, a notification indicating that the upgrade is to be implemented by the remaining set of edge devices.

13. The device of claim 7, wherein the one or more processors are further to:
receive updated base confidence factor data and updated variable confidence factor data associated with implementing the upgrade by the set of edge devices; and
recalculate the confidence score based on the updated base confidence factor data and the updated variable confidence factor data.

14. The device of claim 7, wherein the boosting factor data includes data identifying one or more of:
a critical bug fix associated with the upgrade, or
a security incident response team issue fix associated with the upgrade.

15. A non-transitory computer-readable medium storing a set of instructions, the set of instructions comprising:
one or more instructions that, when executed by one or more processors of a device, cause the device to:
identify an upgrade for a plurality of edge devices;
cause the upgrade to be intermittently implemented by a set of edge devices of the plurality of edge devices;
receive base confidence factor data and variable confidence factor data associated with implementing the upgrade by the set of edge devices;
calculate a confidence score based on the base confidence factor data and the variable confidence factor data;
receive updated base confidence factor data and updated variable confidence factor data associated with implementing the upgrade by the set of edge devices;
recalculate the confidence score based on the updated base confidence factor data and the updated variable confidence factor data;
determine whether the confidence score satisfies a threshold score;
based on a determination that the confidence score fails to satisfy the threshold score, cause the upgrade to be removed from the set of edge devices;
based on a determination that the confidence score satisfies the threshold score threshold, cause the upgrade to be implemented by a remaining set of edge devices, of the plurality of edge devices;

receive boosting factor data associated with implementing the upgrade by the set of edge devices; and increase the confidence score based on the boosting factor data.

16. The non-transitory computer-readable medium of claim 15, wherein the one or more instructions further cause the device to:

receive adverse factor data associated with implementing the upgrade by the set of edge devices; and decrease the confidence score based on the adverse factor data.

17. The non-transitory computer-readable medium of claim 15, wherein the one or more instructions further cause the device to:

identify a modification to the upgrade that generates a modified upgrade; and cause the modified upgrade to be immediately implemented by the plurality of edge devices.

18. The non-transitory computer-readable medium of claim 15, wherein a size of the set of edge devices is less than a size of the remaining set of edge devices.

19. The non-transitory computer-readable medium of claim 15, wherein the one or more instructions, that cause the device to cause the upgrade to be removed from the set of edge devices, cause the device to:

instruct the set of edge devices to remove the upgrade; or provide, to a user, a notification indicating that the upgrade is to be removed from the set of edge devices.

20. The non-transitory computer-readable medium of claim 15, wherein the boosting factor data includes data identifying one or more of:

a critical bug fix associated with the upgrade, or a security incident response team issue fix associated with the upgrade.

* * * * *